United States Patent [19]

Johnson

[11] 4,039,695

[45] Aug. 2, 1977

[54] COMPACTED GRATED CHEESE

[75] Inventor: John D. Johnson, Evanston, Ill.

[73] Assignee: Kraftco Corporation, Glenview, Ill.

[21] Appl. No.: 625,929

[22] Filed: Oct. 28, 1975

[51] Int. Cl.$^2$ .................. A23C 19/14; A01J 27/00
[52] U.S. Cl. ............................ 426/582; 426/454; 426/512
[58] Field of Search .................. 426/582, 454, 512

[56] References Cited

U.S. PATENT DOCUMENTS

| 2,279,202 | 4/1942 | Musher | 426/582 X |
| 3,463,641 | 8/1969 | Berardi et al. | 426/512 X |
| 3,843,808 | 10/1974 | Ziccarelli | 426/582 |

OTHER PUBLICATIONS

Kosikowski, F., Cheese and Fermented Milk, Foods, Published by the Author, Cornell University, Ithaca, N.Y., 1966 (pp. 186-188 & 193).

Hanrahan et al., Properties of Compressed Nonfat Dried Milk, J. of Da. Sci., vol. 48, No. 1, 1965 (pp. 1533-1535).

Compression of Dehydrated Foods Will Save Shipping Space, Food Industries, Feb. 1943 (pp. 74-75).

Wallee, J. P., Take New Look at Tableting, Food Engineering, vol. 38, No. 6, 1966 (pp. 50-54).

*Primary Examiner*—David M. Naff
*Attorney, Agent, or Firm*—Fitch, Even, Tabin & Luedeka

[57] ABSTRACT

Hard grated cheese is comminuted to provide a grated cheese product. The grated cheese product is then subjected to pressure to provide a compact of grated cheese which may be readily packaged and stored. The compact is easily crumbled by hand to provide a grated cheese product for use when desired.

8 Claims, No Drawings

COMPACTED GRATED CHEESE

The present invention relates generally to the treatment of hard cheese which is ripened by bacteria. Examples of this type of cheese are Parmesan, Romano, Sapsado, Spalen and Asiago. Such cheeses are sometimes referred to as grating cheese or hard grating cheese. More particularly, the present invention is directed to improvement in the packaging of grated, hard cheese, such as Parmesan cheese.

Fully cured Parmesan, and other grating cheeses, is very hard and keeps almost indefinitely. It is easily grated and its primary use is in the form of grated cheese in salads, soups, and various foods. During the curing period for hard grating cheeses, the cheese loses moisture and the final moisture analysis of most hard grating cheese is about 30 to about 34 percent by weight.

The flavor of Parmesan, Romano and other hard grating cheeses is distinctive and the flavor of each type of cheese is well known to users of the cheese product. It is known to pre-grate this group of cheeses and to dry the grated cheese to a moisture content of less than about 18 percent. The drying of the cheese is considered necessary to provide a grated cheese product that has sufficient shelf life. However, when the pregrated cheese product is dried, the flavor characteristics of the cheese product change and the product is less desirable than freshly grated cheese having a higher level of moisture. It is also known to package pre-grated hard grating cheese having the usual moisture level of this class of cheese product by hermetic packaging accompanied by vacuum deaeration or inert gas flushing. However, such packaging efforts are expensive in that the volume of the grated cheese requires a large, gas impervious container, such as glass. It would be desirable to provide a means for packaging and distributing pre-grated cheese wherein the costs of packaging and the container are reduced.

Accordingly, it is a principal object of the present invention to provide a package of hard grating cheese, such as Parmesan cheese and Romano cheese.

It is another object of the present invention to provide a method for packaging pre-grated cheese of the hard, grating cheese type.

It is a further object of the present invention to provide a method for packaging pre-grated cheese having the usual level of moisture associated with the cheese.

These and other objects will become more apparent from the following detailed description.

Generally, in accordance with various features of the present invention, hard grating cheese is comminuted to provide a grated cheese product. The grated cheese product is then subjected to pressure to provide a compact of grated cheese which may be readily packaged and stored. The compact is easily crumbled by hand to provide a grated cheese product for use when desired. It is also possible to provide relatively large compacts of grated cheese which can be sliced or cut into desired portions and crumbled for use as desired.

Any hard grating cheese may be subjected to the method of the present invention for providing a compact of the cheese. In this connection, the hard grating cheese will generally have a moisture content of from about 30 to about 34 percent by weight and a fat content, dry basis, of from about 30 to about 42 percent by weight. The cheese after grating is preferably subjected to pressure to provide the compact before any substantial moisture loss occurs. Furthermore, there is no substantial moisture loss from the compacted, grated cheese during storage of the compact. Consequently, a pre-grated, hard cheese product can be provided which has the level of moisture normally associated with the cheese and such product is more desirable than a dried, pre-grated product which has been available heretofore. However, it should be understood that the grated cheese can be dried to any desired moisture content within the range of from about 3 percent to the full moisture content of the cheese. The dried grated cheese can then be formed into compacts in accordance with the invention.

The hard, grating cheese is comminuted by means of any suitable apparatus to provide grated cheese. It is preferred that the particle size of the grated cheese be in the range of from about 0.5 mm to about 5 mm. Less than about 10 percent of the cheese particle should have their longest dimension greater than about 2 mm and at least about 70 percent of the cheese particles should have their longest dimension less than about 1 mm. It has also been determined that the cheese particles should have a length to width ratio of less than about 3:1 and preferably should have a length to width ratio in the range of from about 1:1 to about 2.0:1.

In the method of the invention, pressure is established on the grated, hard cheese while the grated, hard cheese is confined in a chamber. A pressure in the range of from about 30 to about 500 psig is sufficient to form a compact of the grated, hard cheese. However, high pressures up to about 2000 psig can be used without detriment. After the desired pressure has been established, the pressure is maintained for a period of from about 1 second to about 5 minutes.

After the particles are subjected to pressure, the density of the particles is increased to within the range of from 0.88 to about 1.12 gms/cc.

In one example of the invention, the grated, hard cheese is loaded into a die. A piston is then used to establish pressure on the grated cheese in the die. In another embodiment of the invention, the grated, hard cheese is stuffed by suitable apparatus into one end of a straight-walled container which is closed at the opposite end. The straight-walled container may be rigid or may be a length of flexible tubing. Suitable apparatus for stuffing the grated cheese into flexible casings is described in U.S. Pat. No. 3,562,910 to Heinz F. Runge et al., which issued Feb. 16, 1971.

In general, the method of the present invention is suitable for making compacts of grated cheese having uniform cross section, such as circular, elliptical, square, rectangular or polygonal. Any cross sectional dimension and any length of compact can be prepared. It is preferred, however, to use circular housings to produce cylindrical compacts. A relatively long compact can be provided which can subsequently be cut to provide slices of compacted, hard cheese which can be utilized as desired. In a particularly preferred embodiment of the present invention, sufficient hard cheese is compacted in a housing to provide a controlled portion of grated cheese which is sufficient for a single usage. Compacts of grated cheese having from about 0.25 to about 2 ounces of cheese are preferred for such portion controlled usage.

After the compact of grated cheese is formed, the compact is packaged by overwrapping the compact with a suitable packaging material. It is also preferred that the packaging material be impervious to gas. It is also preferred to use a packaging material that can be sealed to provide a gas tight package.

The compact of grated cheese of the present invention is shelf stable under refrigeration conditions for a substantial period of time of up to about 6 months.

The following Example further illustrates various features of the present invention but is intended to in no way limit the scope of the invention which is defined in the appended claims.

EXAMPLE

A block of Parmesan cheese having a moisture content of 30.5 percent is comminuted to provide a grated cheese product. The comminution is effected by introducing pieces of the Parmesan cheese in a food chopper identified by the tradename, Sydleman cutter. The food chooper is equipped with a chopper bowl which rotates beneath six cutter blades, which continuously rotate. The chopper bowl was rotated at 64 rpm. A comminuted cheese product is obtained having a particle size distribution as follows:

| + 2.4 mm | + 2.0 | + 1.7 | + .85 | − .85 |
|---|---|---|---|---|
| 1.2 | 4.3 | 7.8 | 47.20 | 38.00 |

The length of width ratio of the particles is about 1.5.

The comminuted cheese product is then made into compacts in accordance with the invention. 30 grams of the comminuted cheese product are loaded into a cylindrical die having a diameter of 2¼ inches. The cheese in the die is compacted by forcing a piston into the die and establishing a pressure of 40 psig on the comminuted cheese in the die. After pressure of 40 psig is obtained, the pressure is held for about 2 seconds and is uniformly released. A compact of grated cheese is obtained which is 2¼ inches in diameter and ½ inches thick. The compact has a density of 0.92 grams/cc. The compact is easily crumbled to provide a grated cheese product.

What is claimed is:

1. A method for treating hard grating cheese consisting essentially of comminuting a hard grating cheese to provide grated cheese particles, less than about 10 percent of said cheese particles having a size greater than about 2 mm and at least about 70 percent of the particles have a size less than about 1 mm and said grated cheese particles having a length to width ratio of less than about 3:1, said cheese particles having a moisture content in the range of from about 30 to about 34 percent by weight and a fat content, dry basis, of from about 30 to about 42 percent by weight and subjecting said grated cheese particles to pressure by placing said grated cheese particles in a die and compressing said grated cheese at a pressure of from about 30 to about 500 psig to form a cheese compact which can be easily crumbled by hand to provide a grated cheese product.

2. A method of accordance with claim 1 wherein said comminution is sufficient to provide grated cheese particles having a particle size in the range of from about 0.5 mm to about 5 mm.

3. A method in accordance with claim 1 wherein said compact has from about 0.25 to about 2 ounces of said grated cheese particles.

4. A method in accordance with claim 1 wherein said compact is formed by placing said grated cheese particles in a die.

5. A method in accordance with claim 4 wherein said die is a cylindrical die.

6. A method in accordance with claim 1 wherein said grated cheese has a length to width ratio in the range of from about 1:1 to about 2:1.

7. A compact of hard grating cheese prepared by the method of claim 1, said compact consisting essentially of said grated cheese particles, said compact having a density of from 0.88 to about 1.12 gm/cc and said cheese particles having a particle size in a range of from about 0.5 mm to about 5 mm.

8. A compact in accordance with claim 7 wherein said particles of grated cheese have a length to width ratio in the range of from about 1:1 to about 2:1.

* * * * *